United States Patent [19]
Kanamori et al.

[11] Patent Number: 5,754,854
[45] Date of Patent: May 19, 1998

[54] METHOD AND SYSTEM FOR PROVIDING A GROUP OF PARALLEL RESOURCES AS A PROXY FOR A SINGLE SHARED RESOURCE

[75] Inventors: Atsushi Kanamori; Jon Thomason, both of Redmond, Wash.

[73] Assignee: Microsoft Corporation, Redmond, Wash.

[21] Appl. No.: 338,667

[22] Filed: Nov. 14, 1994

[51] Int. Cl.$^6$ ............................................. G06F 13/14
[52] U.S. Cl. ................................... 395/674; 395/677
[58] Field of Search ............................ 395/650, 700, 395/600, 675, 800, 672, 673, 674, 677, 481, 684

[56] References Cited

U.S. PATENT DOCUMENTS

| | | |
|---|---|---|
| 5,060,150 | 10/1991 | Simor . |
| 5,099,418 | 3/1992 | Pian et al. ........................... 395/672 |
| 5,377,350 | 12/1994 | Skinner ............................. 395/672 |
| 5,408,470 | 4/1995 | Rothrock et al. . |
| 5,511,197 | 4/1996 | Hill et al. . |

OTHER PUBLICATIONS

"Proxies, Application Interfaces, and Distributed Systems.", Amitabh Dave et al. Object Orientation in OperatingSystems 1992. Int'l Workshop Sep. 24–25, 1992.

M. Pietrik, "Understanding Windows 95 memory management: paging address spaces and contexts", Microsoft Systems Journal, v10, n4, p. 19(13), Apr. 1995.

R. H. Shaw, "An introduction to the Win32 API", P Magazine, v13, n8, p. 291(5), Apr. 26 1994.

R. W. Schmidt, H. M. Levy, J. S. Chase, "Using Shared Memory for Read–Mostly RPC Services", IEEE ondisc, pp. 141–149, 1996.

Primary Examiner—Alvin E. Oberley
Assistant Examiner—Sue Lao
Attorney, Agent, or Firm—Seed and Berry LLP

[57] ABSTRACT

A method and system for providing a group of parallel resources as a proxy for a single shared resource is provided. In a preferred embodiment, a resource grouping facility ("the facility") is incorporated in a "non-global" operating system. A non-global operating system is an operating system that is unable to respond correctly to a request to allocate a global resource of a particular type, such as a memory block, that can be accessed by every program executing in conjunction with the operating system. Instead, a non-global operating system allocates a putatively global resource that may not be accessed by every program executing in conjunction with the non-global operating system. When the facility detects that a transferor program is attempting to share a putatively global resource allocated by the operating system with a transferee program, the facility allocates a proxy resource that is accessible to the transferee. The facility may also allocate one or more intermediate resources accessible to other programs. The facility tracks the putatively global resource and all of the proxy resources as a proxy group. In a preferred embodiment, the facility also copies characteristics of the putatively global resource to the proxy resources. For example, where the putatively global resource and the proxy resources are a memory block, the facility preferably copies the contents of the putatively global memory block to the proxy memory blocks. When the facility detects that a program is attempting to deallocate a member of the proxy group, that is, a putatively global resource or one of its proxies, the facility preferably deallocates each member of the proxy group.

19 Claims, 13 Drawing Sheets

METHOD AND SYSTEM FOR PROVIDING A GROUP OF PARALLEL RESOURCES AS A PROXY FOR A SINGLE SHARED RESOURCE

TECHNICAL FIELD

The invention relates generally to a method and system for providing shared resources, and, more specifically, to a method and system for providing a group of parallel resources as a proxy for a single shared resource.

BACKGROUND OF THE INVENTION

It is common for a program that is executing on a computer system to transfer data to another program. For example, a spreadsheet program may transfer data comprising the results of calculations to a graphing program, which would then present the results of the transferred data visually as a graph. Programs that participate in such data transfer are referred to herein as "communicating programs." In a particular transfer, the program transferring data is called the "transferor," and the program to which data is transferred is called the "transferee." In some cases, there may be more than one transferee in a single transfer, each of which receive the transferred data.

A communicating program usually performs data transfers using one or more published data transfer protocols in order to maximize the number of other programs to or from which it can transfer data. Many such data transfer protocols, referred to herein as "shared memory protocols," specify that the transferor stores the transferred data in memory accessible to both programs, then passes a reference to the transferee, which uses the reference to access the transferred data. A reference may be a pointer or a handle which may be converted to a pointer.

Figure 1:
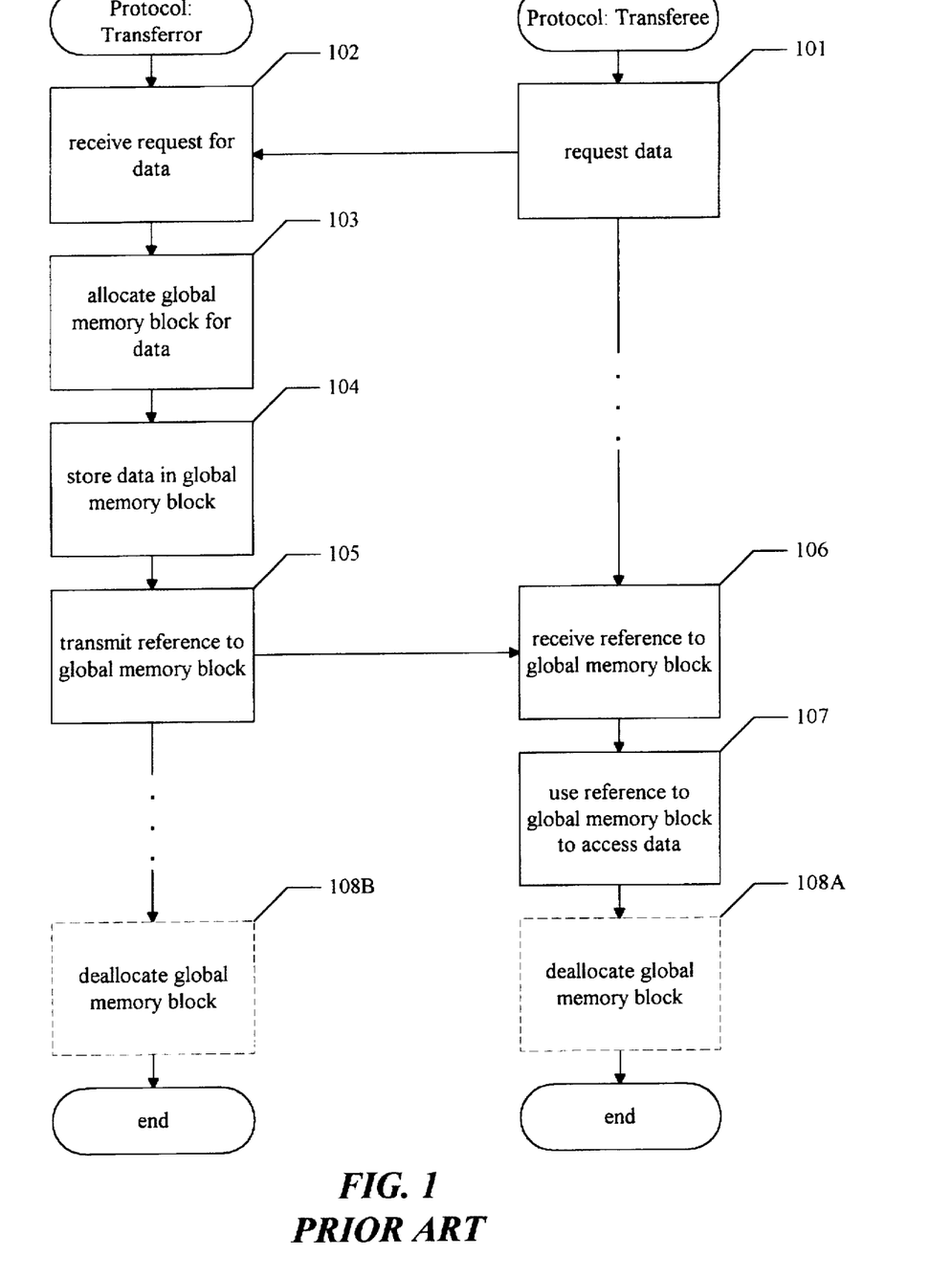
FIG. 1 is a flow diagram illustrating a data exchange between two communicating programs using a conventional shared memory protocol.

FIG. 1 is a flow diagram illustrating a data exchange between two communicating programs using a shared memory protocol. The steps shown in FIG. 1 are organized into two columns: the left column contains steps 102, 103, 104, 105, and 108B, which are performed by the transferor, and the right column contains steps 101, 106, 107, and 108A, which are performed by the transferee. In step 101, the transferee requests data from a transferor. This involves transmitting a request identifying the requested data from the transferee to the transferor via an interprocess communication mechanism. For example, the transferee may send a message to the transferor, or may call a notification routine of the transferor. In step 102, the transferor receives the request for data transmitted by the transferee in step 101. In step 103, the transferor allocates a global memory block that will be accessible to both the transferor and the transferee. As part of the allocation process, the transferor receives a reference to the allocated global memory block. In step 104, the transferor uses the reference to store the data identified in the request received in step 102 in the allocated global memory block. In step 105, the transferor uses an interprocess communication mechanism to transmit the reference to the global memory block to the transferee. In step 106, the transferee receives the reference to the global memory block transmitted by the transferor in step 105. In step 107, the transferee uses the reference received in step 106 to access the data in the global memory block. In step 108A, after it has finished accessing the data in the global memory block, the transferee deallocates the global memory block so that it may be allocated again for another use. Alternatively, in step 108B, the transferor deallocates the global memory block, either a predetermined length of time after it transmits the reference in step 105, or when subsequently notified by the transferee that the transferee has finished accessing the data in the global memory block (not shown). Each individual protocol either specifies that the transferee deallocates the global memory block (step 108A), that the transferor deallocates the global memory block (step 108B), or that the transferee and the transferor negotiate via interprocess communication to themselves determine which program will deallocate the global memory block (not shown).

The services used by communicating programs to allocate, write to, read from (or "access"), and deallocate memory blocks as described above are generally provided by other, centralized programs in the computer system comprising an operating system. While many operating systems provide a memory allocation service that enables a transferor to allocate a global memory block that is accessible to both the transferor and a transferee in step 105, some operating systems do not provide a memory allocation service that enables a transferor to allocate a global memory block that is accessible to the transferee. When communicating programs are executed on a computer system having an operating system whose memory allocation service does not enable a transferor to allocate a global memory block that is accessible to both the transferor and the transferee, data transfers via shared memory between the communicating programs are prevented, since the allocation step 103 succeeds, but the accessing step 107 fails and the transferee is unable to read the transferred data from the allocated block.

For instance, some operating systems that support the execution of both programs compiled for 16-bit word size and programs compiled for 32-bit word size do not allocate memory blocks accessible to other programs in response to a request from a program compiled for 32-bit word size to allocate a global memory block. This prevents data transfers using shared memory where the transferor is a program compiled for 32-bit word size. Further, in such an operating system, the references to memory blocks holding transferred data stored in the transfer message are formatted differently for programs compiled for 16-bit word size and programs compiled for 32-bit word size. As a result, the transferee in a shared memory data transfer is unable to use the reference stored in the transfer message to access the transferred data where it was compiled for a different word size than was the transferor, as the reference has the wrong format.

Further, some operating systems perform the interprocess communication between steps 105 and 106 in two or more "stages" that each require the execution of a separate program within the operating system or associated with the receiver. Debugging programs for monitoring interprocess communication traffic may incorporate themselves in, or "hook," any of these intermediate programs, intercept the data transfer communication, and use the reference inside to access the transferred data. If the global data block allocated in step 103 is not accessible to an intermediate program, it will not be accessible to a debugging tool that incorporates itself in the intermediate program, thereby frustrating the purpose of the debugging program.

SUMMARY OF THE INVENTION

It is an object of the invention to provide a method and system in a computer system for providing a group of parallel resources as a proxy for a single shared resource.

It is another object of the invention to provide a method and system in a computer system for providing one or more private memory blocks in the place of a global memory block.

It is yet another object of the invention to provide a method and system in a computer system for facilitating shared memory data transfer from one transferor program to one or more transferee programs without utilizing global memory blocks.

It is a further object of the invention to provide a method and system in a computer system for maintaining and deleting groups of parallel resources.

These and other objects, which will become apparent as the invention is more fully described below, are provided by a method and system for providing a group of parallel resources as a proxy for a single shared resource. In a preferred embodiment, a resource grouping facility ("the facility") emulates the sharing of a resource between two programs that cannot both directly access the resource. The facility first receives an indication that a first program is attempting to provide a public original resource to a second program. The facility, in response to receiving the indication, creates a private proxy resource from the public original resource that is accessible to the second program. The facility then provides the private proxy resource it has created to the second program.

In a further preferred embodiment, the facility is incorporated in a "non-global" operating system. A non-global operating system is an operating system that is unable to respond correctly to a request to allocate a global resource of a particular type, such as a memory block, that can be accessed by every program executing in conjunction with the operating system. Instead, a non-global operating system allocates a putatively global resource that may not be accessed by every program executing in conjunction with the non-global operating system. When the facility detects that a transferor program is attempting to share with a transferee program a putatively global resource allocated by the operating system, the facility allocates a proxy resource that is accessible to the transferee. The facility may also allocate one or more intermediate resources accessible to other programs. The facility tracks the putatively global resource and all of the proxy resources as a proxy group. In a preferred embodiment, the facility also copies characteristics of the putatively global resource to the proxy resources. For example, where the putatively global resource and the proxy resources are a memory block, the facility preferably copies the contents of the putatively global memory block to the proxy memory blocks. When the facility detects that a program is attempting to deallocate a member of the proxy group, that is, a putatively global resource or one of its proxies, the facility preferably deallocates each member of the proxy group.

DETAILED DESCRIPTION OF THE INVENTION

A method and system for providing a group of parallel resources as a proxy for a single shared resource is provided. In a preferred embodiment, a resource grouping facility ("the facility") is incorporated in a "non-global" operating system. A non-global operating system is an operating system that is unable to respond correctly to a request to allocate a global resource of a particular type, such as a memory block, that can be accessed by every program executing in conjunction with the operating system. Instead, a non-global operating system allocates a putatively global resource that may not be accessed by every program executing in conjunction with the non-global operating system. When the facility detects that a transferor program is attempting to share a putatively global resource allocated by the operating system (also called a "public resource") with a transferee program, the facility allocates a proxy resource (also called a "private resource") that is accessible to the transferee (also called an "accessing agent"). The facility may also allocate one or more intermediate resources accessible to other programs. The facility tracks the putatively global resource and all of the proxy resources as a proxy group. In a preferred embodiment, the facility also copies characteristics of the putatively global resource to the proxy resources. For example, where the putatively global resource and the proxy resources are a memory block, the facility preferably copies the contents of the putatively global memory block to the proxy memory blocks. When the facility detects that a program is attempting to deallocate a member of the proxy group, that is, a putatively global resource or one of its proxies, the facility preferably deallocates each member of the proxy group.

Another approach to the problem of deallocating the members of a proxy group involves closely monitoring the data sharing conversation that occurs between the transferor and the transferee. The conversation comprises the request for data passed between steps 101 and 102, the transfer message containing a reference to the transferred data between steps 105 and 106, as well as a potentially large number of sharing coordination messages that together determine both whether the transferor or the transferee is responsible for deallocating the memory block, and when the conversation is at an end and the responsible program may deallocate the block. A program that monitors the sharing coordination messages and carefully maintains its own version of the state of the conversation is, in many cases, capable of correctly determining when to deallocate the members of a proxy group for the conversation.

However, because coordination messages may occur in many different combinations, it can be complicated for a program to maintain its own version of the state of the 110 conversation. Further, many transferor and transferee programs do not correctly maintain the state of a conversation by sending the correct sharing coordination messages, either because they terminate abnormally, because they were inadvertently written incorrectly, or because they utilize a informal version of the transfer protocol in which coordination messages are used differently or not at all. For these reasons, the approach used by the facility, as discussed herein, of deallocating all of the members of a proxy group whenever a program deallocates one of the members of the proxy group is both easier to implement and more effective than the approach of closely monitoring the conversation.

Figure 2:
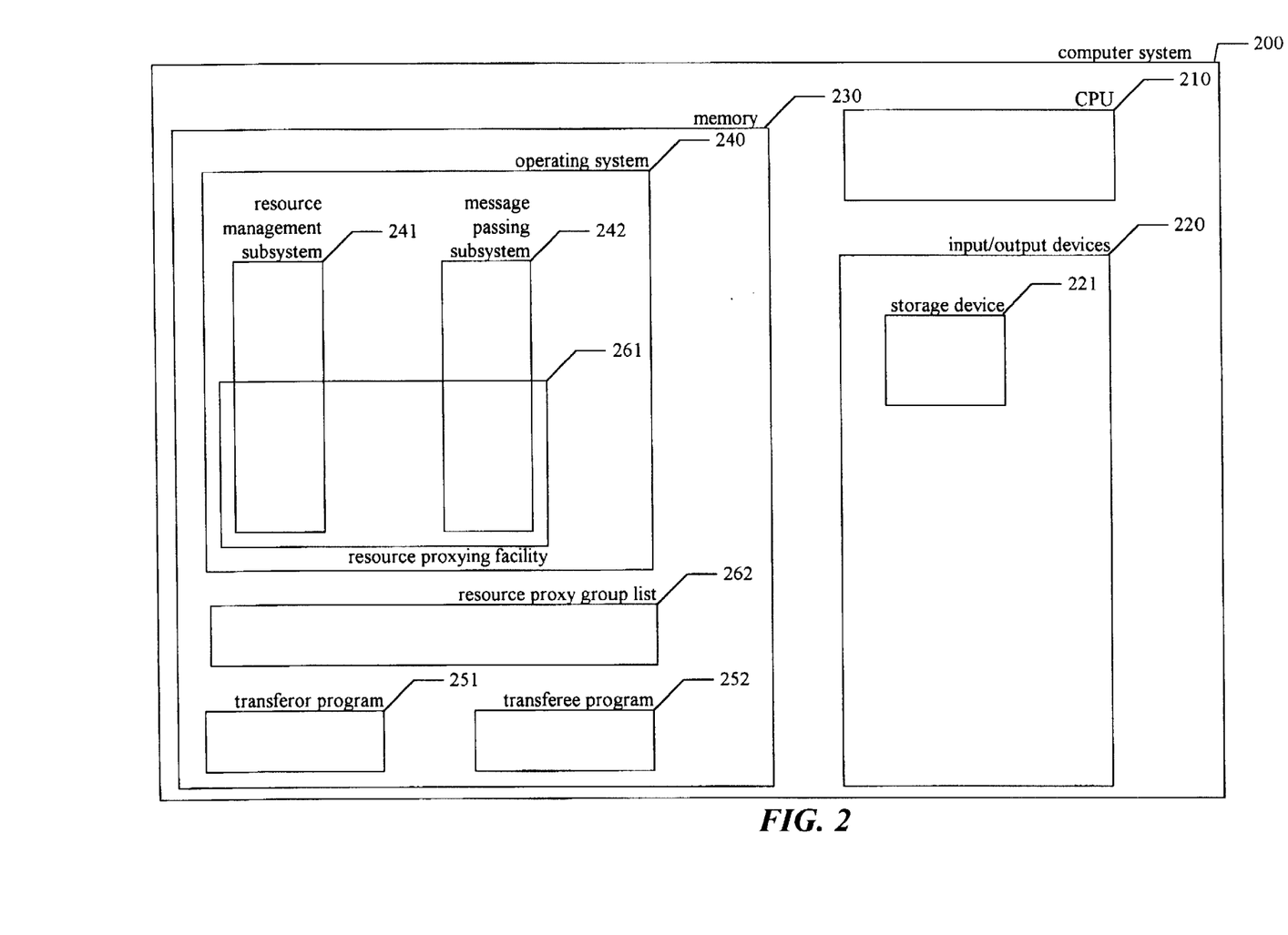
FIG. 2 is a high-level block diagram of the general-purpose computer system upon which the facility preferably operates.

FIG. 2 is a high-level block diagram of the general-purpose computer system upon which the facility preferably operates. The computer system 200 contains a central processing unit (CPU) 210, input/output devices 220, and a computer memory (memory) 230. Among the input/output devices is a storage device 221, such as a hard disk drive. The memory contains an operating system 240 as described above, which includes a resource management subsystem 241 and a message passing subsystem 242. The resource management subsystem is comprised of programs for allocating and deallocating system resources, such as programs for allocating and deallocating memory blocks (not shown). The message passing subsystem is comprised of programs for passing messages or other forms of interprocess communications between programs. The memory also contains two or more communicating programs, including a transferor program 251 that uses the resource management subsystem to allocate shared resources and the message passing subsystem to pass references thereto to a transferee program 252 that uses the message passing subsystem to receive references to resources and the resource management subsystem to access the shared resources to which the references refer, as shown in FIG. 1.

According to a preferred embodiment of the invention, the operating system further contains a resource proxying facility 261 ("the facility"), which is incorporated in the resource management subsystem and message passing subsystem and causes these subsystems to produce proxies of shared resources that are accessible to transferee programs. The facility preferably uses a resource proxy group list 262 ("group list") to track original shared resources and their proxies for group deallocation when any of them are deallocated. While the facility is preferably implemented on a computer system configured as described above, one skilled in the art will recognize that it may also be implemented on computer systems having different configurations.

The operation of the facility is discussed in detail below. While this discussion addresses a preferred embodiment in which the resources shared by the communicating programs are memory blocks, those skilled in the art will appreciate that the facility may also manage proxy groups for other types of shareable system resources, such as dynamic load libraries, bitmaps, fonts, cursors, icons, or string tables.

Figure 3A:
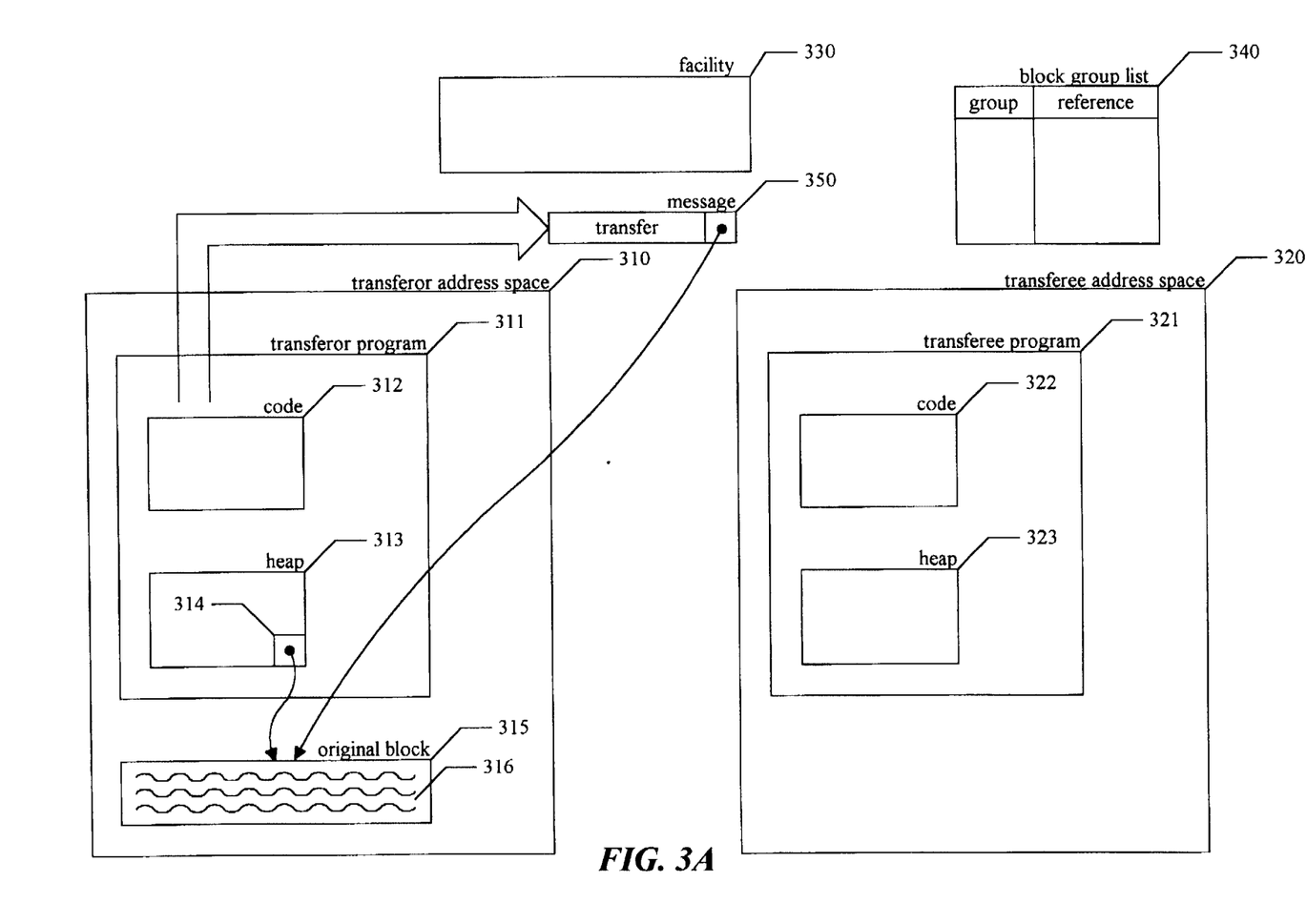
FIGS. 3A–3B are memory diagrams that show the facility enabling a data transfer from a transferor program to a transferee program.
Figure 3B:
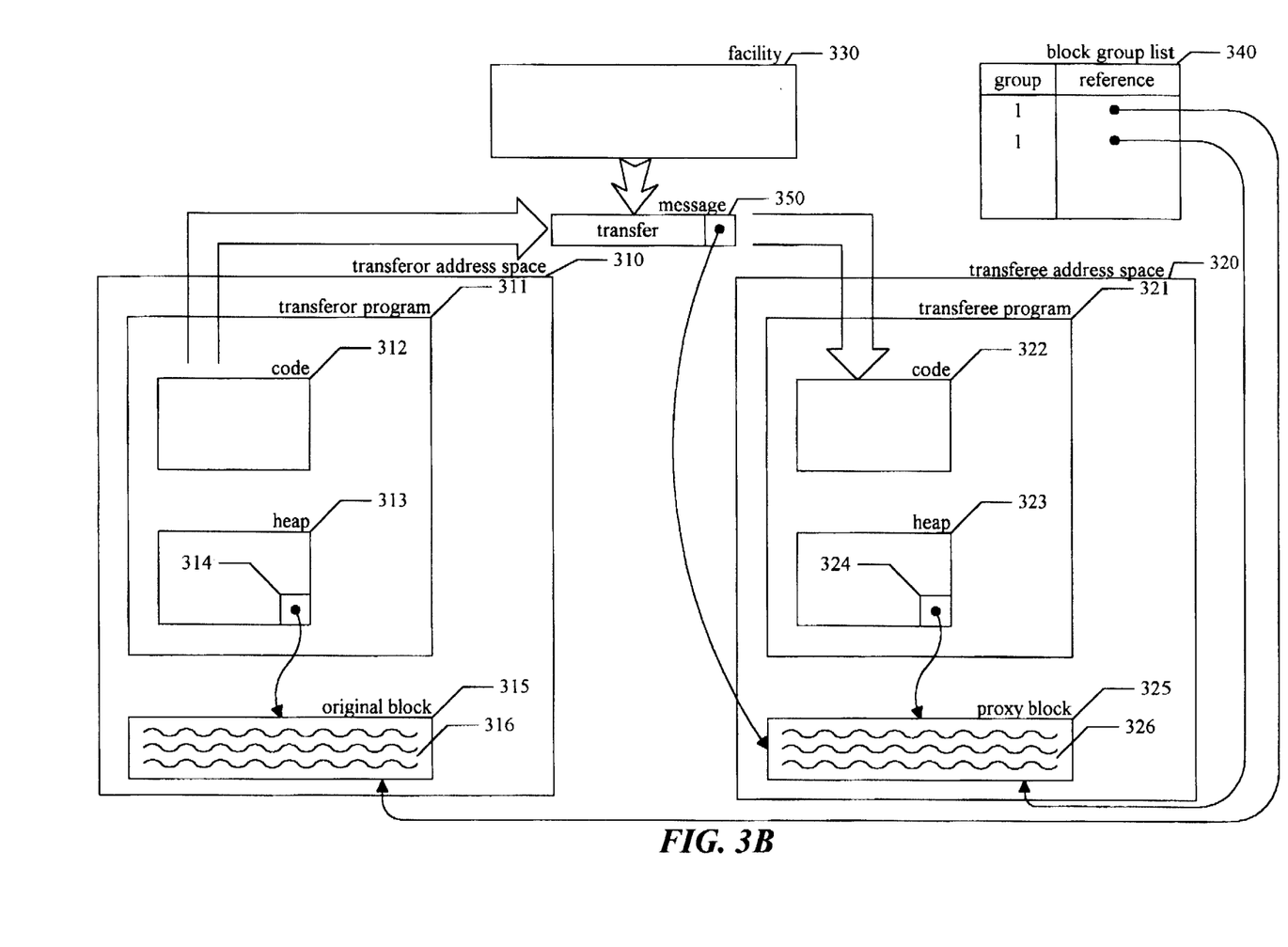

FIGS. 3A-3B are memory diagrams that show the facility enabling a data transfer from a transferor program to a transferee program. FIG. 3A shows the initiation of the data transfer by the transferor program. The transferor code 312 of the transferor program 311 directs a data transfer message ("message") 350 to the transferee program 321. The message contains a reference to an original memory block ("original block") 315 in the address space of the transferor program ("transferor address space") 310, which contains transferred data 316. In a typical operating system, the transferor program code calls the message passing subsystem of the operating system to direct a message to the transferee program, copying a reference to the original block 314, such as a pointer or a handle, into the message from a data heap "heap" 313 of the transferor program. The diagram also shows a memory block proxy group facility ("facility") 330 corresponding to the resource proxying facility 261 of FIG. 2, and an empty memory block group list 340 corresponding to the resource proxy group list 262 of FIG. 2.

FIG. 3B shows the actions of the facility in response to intercepting the transfer message. The facility preferably intercepts the transfer message by hooking the message passing subsystem of the operating system, causing a InterceptTransfer routine of the facility to be called when the transferor program calls the message passing subsystem to direct a transfer message to the transferee program.

Figure 4:
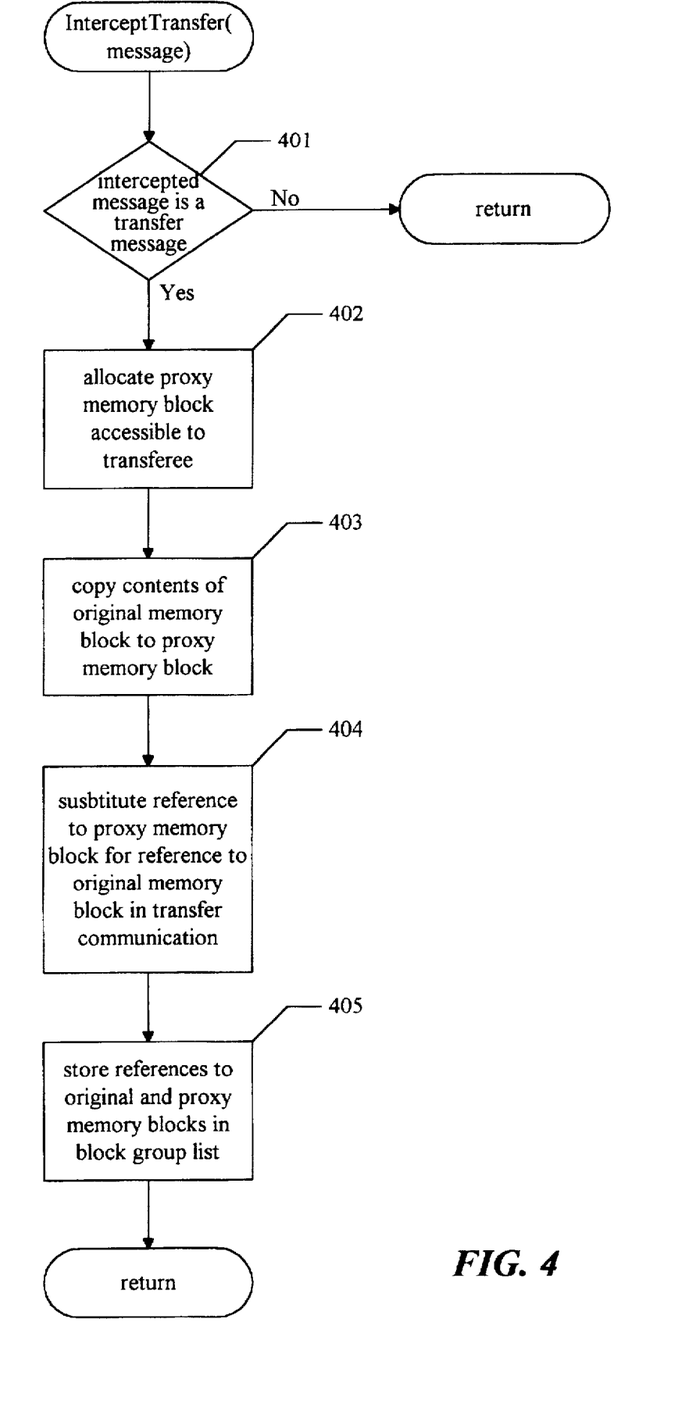
FIG. 4 is a flow diagram of the InterceptTransfer routine that intercepts transfer communications and generates a proxy group for the transferred blocks.

FIG. 4 is a flow diagram of the InterceptTransfer routine of the facility that generates a proxy group for a transferred block when a transfer message is intercepted. In step 401, if the intercepted message is a transfer message, then the facility continues at step 402, else the facility returns to the message passing subsystem to pass the message normally. In step 402, the facility allocates a proxy memory block 325 in the transferee address space 320, which may be accessed by the transferee program. In step 403, the facility makes a copy 326 of the contents of the original block 316 in the allocated proxy memory block. In step 404, the facility substitutes a reference to the proxy block for the reference to the original block in the message 250 that will be delivered to the transferee program. In step 405, the facility stores references to both the original block and the proxy block in the block group list, assigning them both the same unused group number ("1"), and thereby placing them in the same block group. The facility then returns to the message passing subsystem to direct the modified transfer message to the transferee program.

When the transferee program receives the message, its code 322 makes a copy 324 of the reference in the message to the proxy block in its heap 323. The transferee program then uses reference 324 to access the transferred data 326 in the proxy block 325.

When the transferor and transferee programs are finished sharing the transferred data, either the transferor program will attempt to use its reference to deallocate the original block, or the transferee program will attempt to use its reference deallocate the proxy block. In either case, the facility causes each member of the block group, including both the original block and the proxy block, to be deallocated. While this is discussed below with respect to an attempt by the transferee to deallocate the proxy block, the facility preferably deallocates all members of a block group when any program attempts to deallocate any of the members (e.g., when the transferor program attempts to deallocate the proxy block).

Figure 5A:
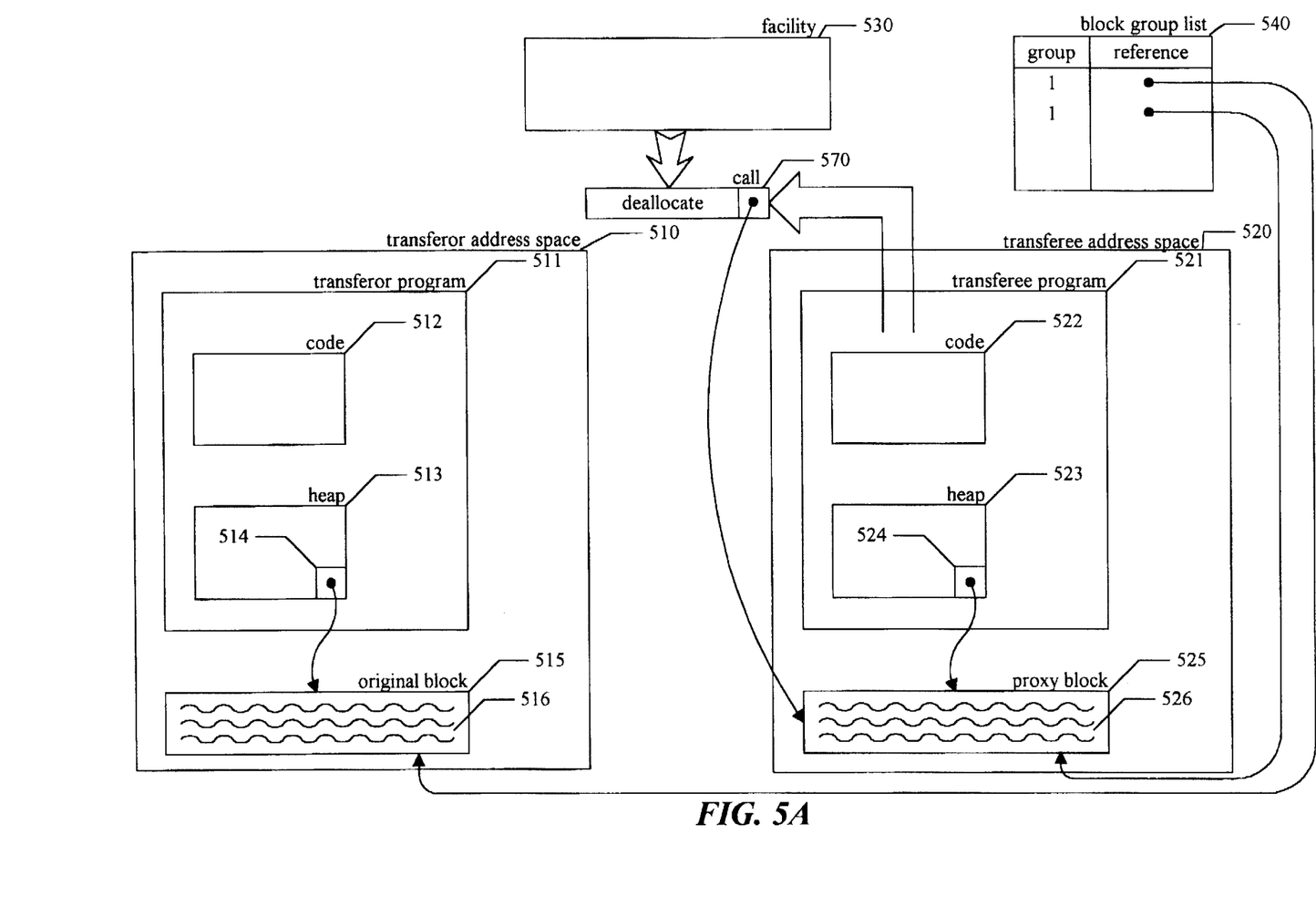
FIGS. 5A–5B are memory diagrams that show the facility reclaiming the resources used for a data transfer after the data transfer is complete.
Figure 5B:
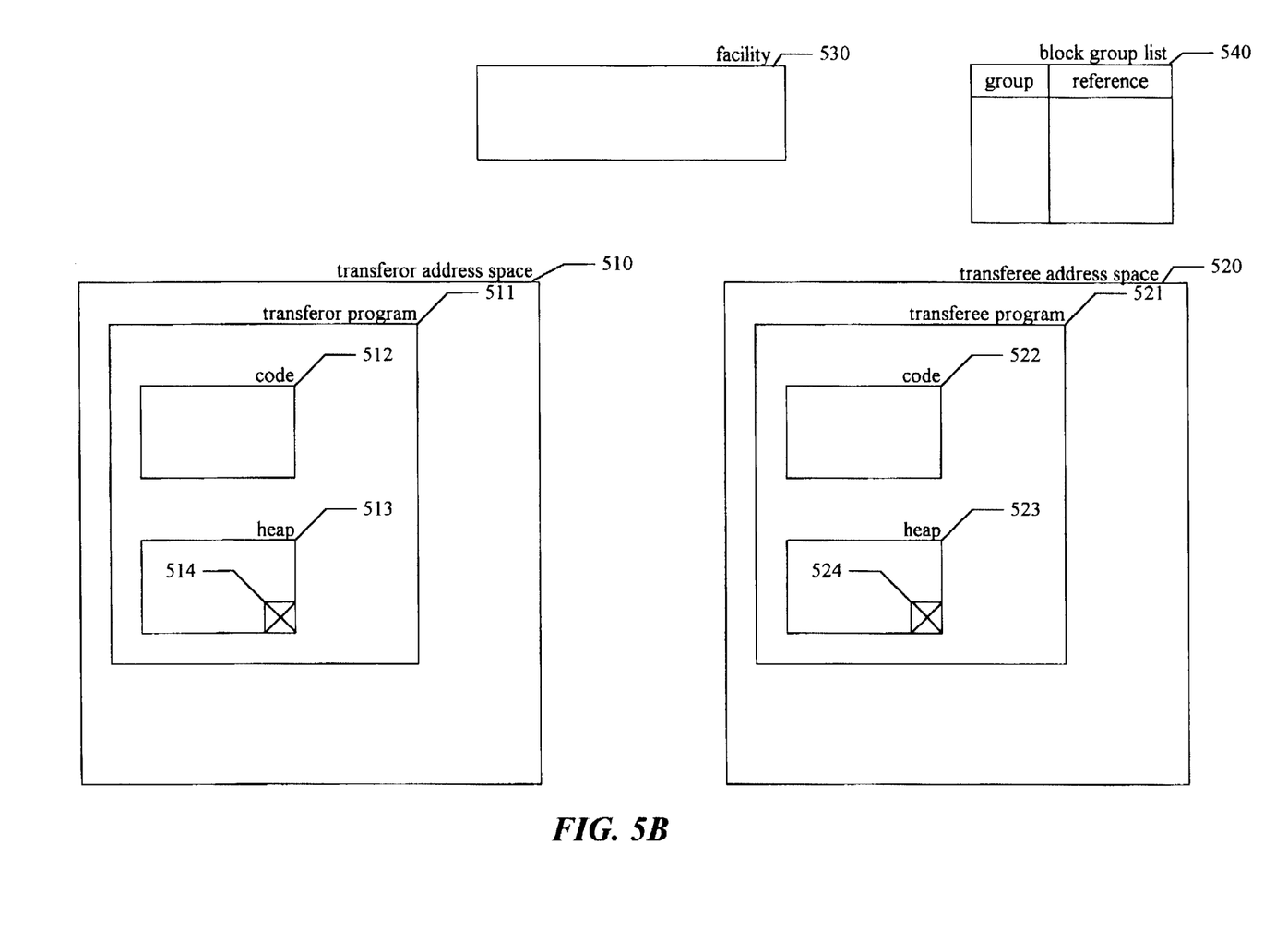

FIGS. 5A-5B are memory diagrams that show the facility reclaiming the resources used for a data transfer after the data transfer is complete. FIG. 5A shows an attempt by the transferee program to deallocate the proxy block. The transferor program 511 has a reference 514 in its heap 513 in its address space 510 which it uses to access the original block 515. Similarly, the transferee program 521 has a reference 524 in its heap 523 in its address space 520 which it uses to access the proxy block 525. The block group list 540 contains references to the original block and the proxy block, both having the same group number ("1"), indicating that they are in the same block group. The code 522 of the transferee program makes a deallocation request 570, which contains a reference to the proxy block copied from reference 524. In a typical operating system, the transferee program code calls the resource management subsystem of the operating system to deallocate the proxy block.

FIG. 5B shows the actions of the facility in response to intercepting the deallocation request. The facility preferably intercepts the deallocation request by hooking the resource management subsystem of the operating system, causing a InterceptDeallocate routine of the facility to be called when the transferee program calls the resource management subsystem to deallocate the proxy block.

Figure 6:
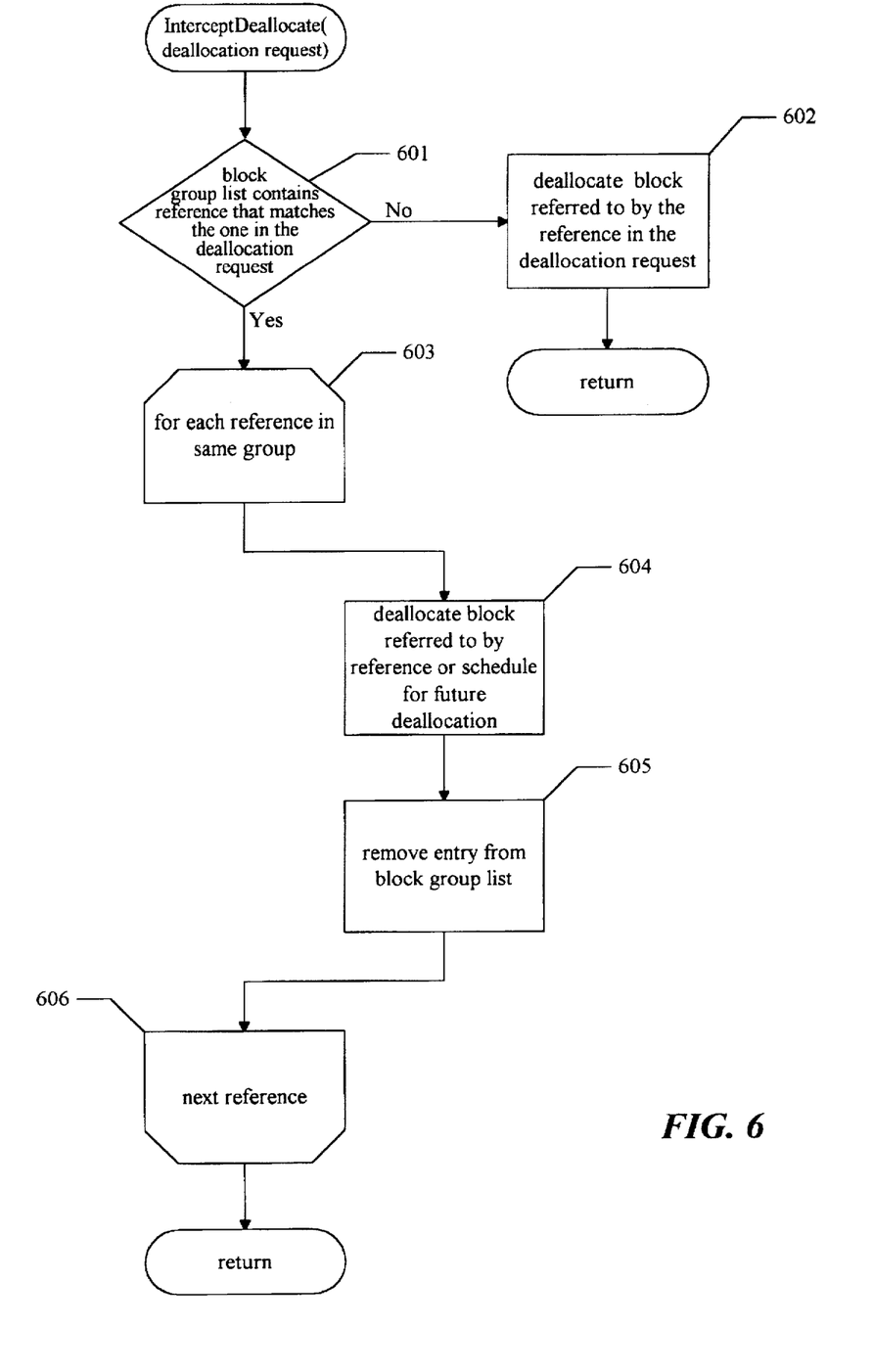
FIG. 6 is a flow diagram of the InterceptDeallocate routine that deallocates the members of a proxy group when an attempt by a program to deallocate one member of the proxy group is intercepted.

FIG. 6 is a flow diagram of the InterceptDeallocate routine that deallocates the members of a block group when an attempt by a program to deallocate one member of the block group is intercepted. In step 601, if the block group list contains a reference matching the reference contained in the intercepted deallocation request, then the facility continues at step 603, else the facility continues at step 602. In step 602, because the block referred to by the reference in the deallocation request is not the member of a block group, the facility causes the resource management subsystem to deallocate that block alone. The facility then returns.

In steps 603–606, the facility deallocates each block in the same block group as the block referred to by the reference in the deallocation request. In steps 603–606, the facility loops through the references in the block group list having the same group number as the reference that matches the reference in the deallocation request (including the reference that matches the reference in the deallocation request). Step 603 marks the beginning of this loop, and step 606 the end. The use of these "loop limit" symbols is discussed on page 6 of ANSI/ISO 5807-1985, a standard for, among other things, symbols and conventions for computer program flowcharts promulgated by the International Standards Organization and adopted by the American National Standards Institute. In step 604, the facility causes the resource management subsystem to deallocate the block referred to by the current reference. In some operating systems, a block may only be deallocated when the program whose address space it is contained in is the "active program" —that is, the program that is currently executing. In such an operating system, if the block referred to by the current reference is not contained in the address space of the active program, in step 604, the facility schedules the future deallocation of the block referred to by the reference. This involves storing an indication containing the current reference that the block to which it refers should be deallocated. When each program is the active program, the facility checks for indications that blocks contained in the address space of the program should be deallocated, and, if any have been stored, the facility then deallocates the indicated blocks and removes the indications. The facility preferably checks for indications when the current program attempts to allocate a new block, since such an attempt represents an immediate need for memory in the current program's address space, and the deallocation may free up enough memory to satisfy the allocation. In step 605, the facility removes the current reference from the block group list. In step 606, the facility repeats steps 604–605 for another reference having the same group number, if any remain. The facility then returns. As a result, each of the blocks allocated to hold the transferred data are deallocated.

In some operating systems, messages, like the transfer messages intercepted by the facility, are sent through one or more intermediary programs associated with the operating system or the transferee program. Each of the intermediate programs may be hooked by debugging programs in order for the debugging programs to monitor message traffic. In some cases, monitoring message traffic involves accessing and displaying transferred data using a reference in a transfer message. To enable such debugging programs to access and display transferred data, the facility preferably creates another proxy block in the address space of each intermediary program and adds it to the block group. Then, when any program attempts to deallocate the original block, a transferee proxy block, or an intermediate proxy block, the facility deallocates all of the blocks in the block group.

Figure 7A:
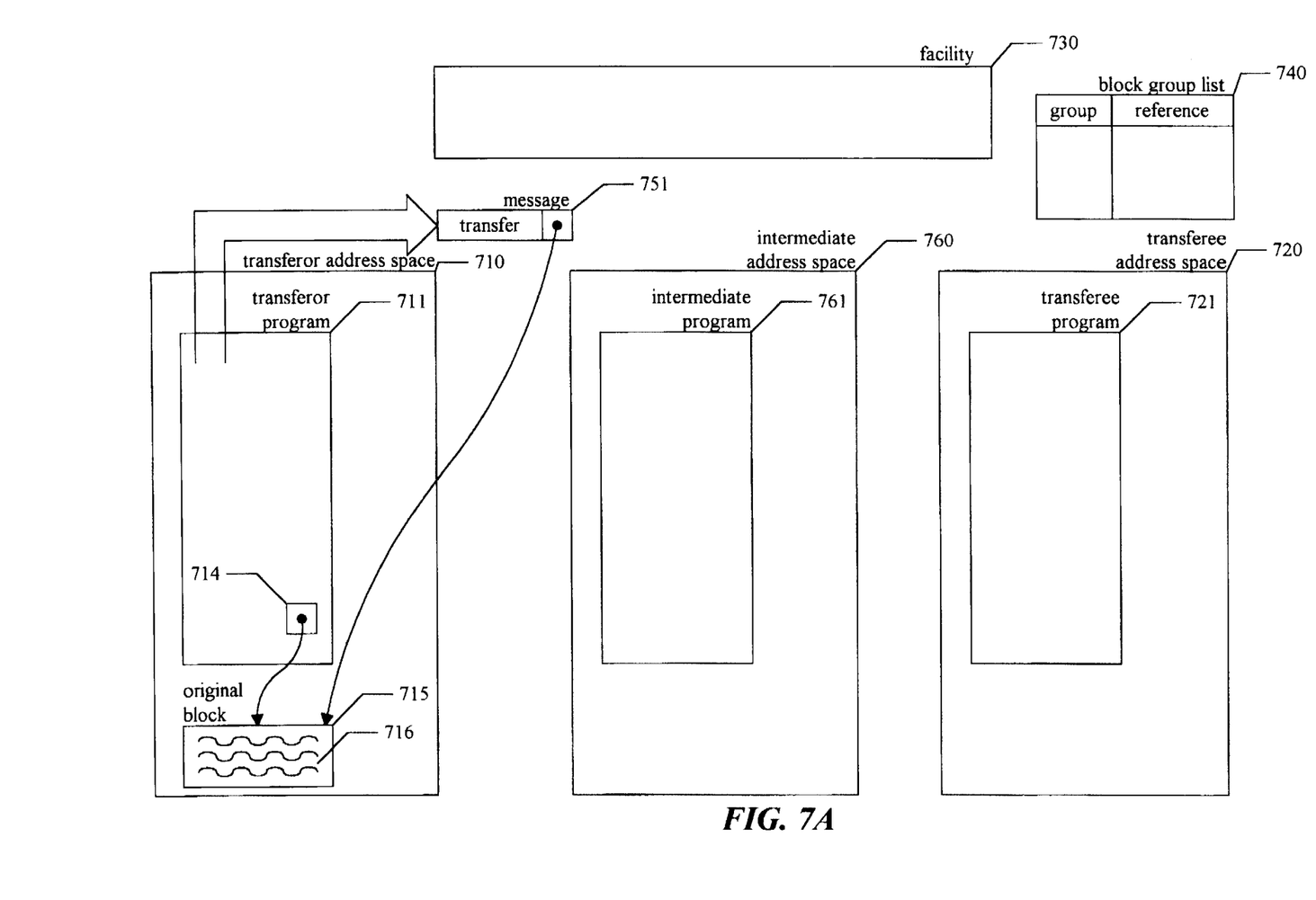
FIGS. 7A–7C are memory diagrams that show the facility enabling a data transfer from a transferor program to a transferee program through an intermediate program.
Figure 7B:
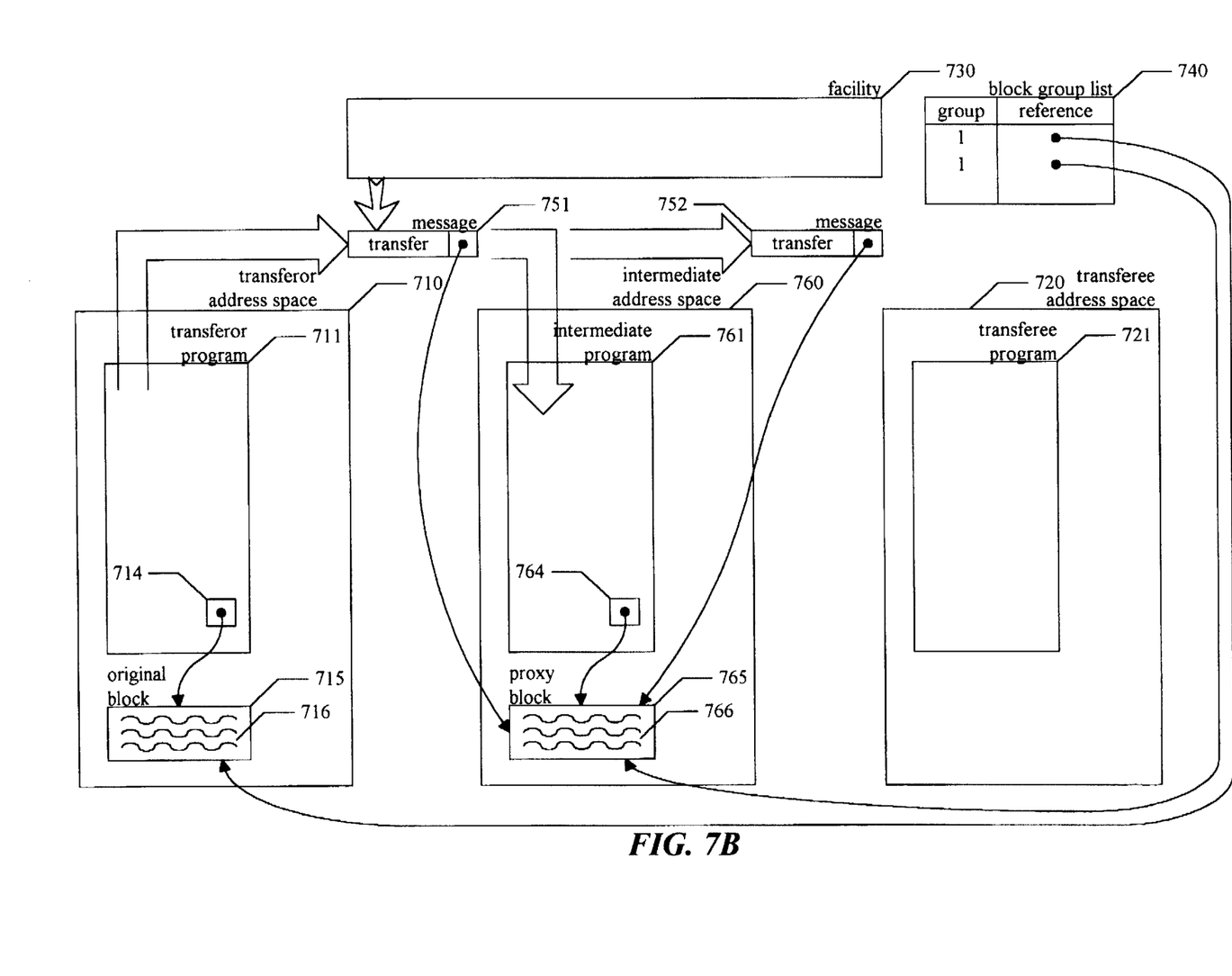
Figure 7C:
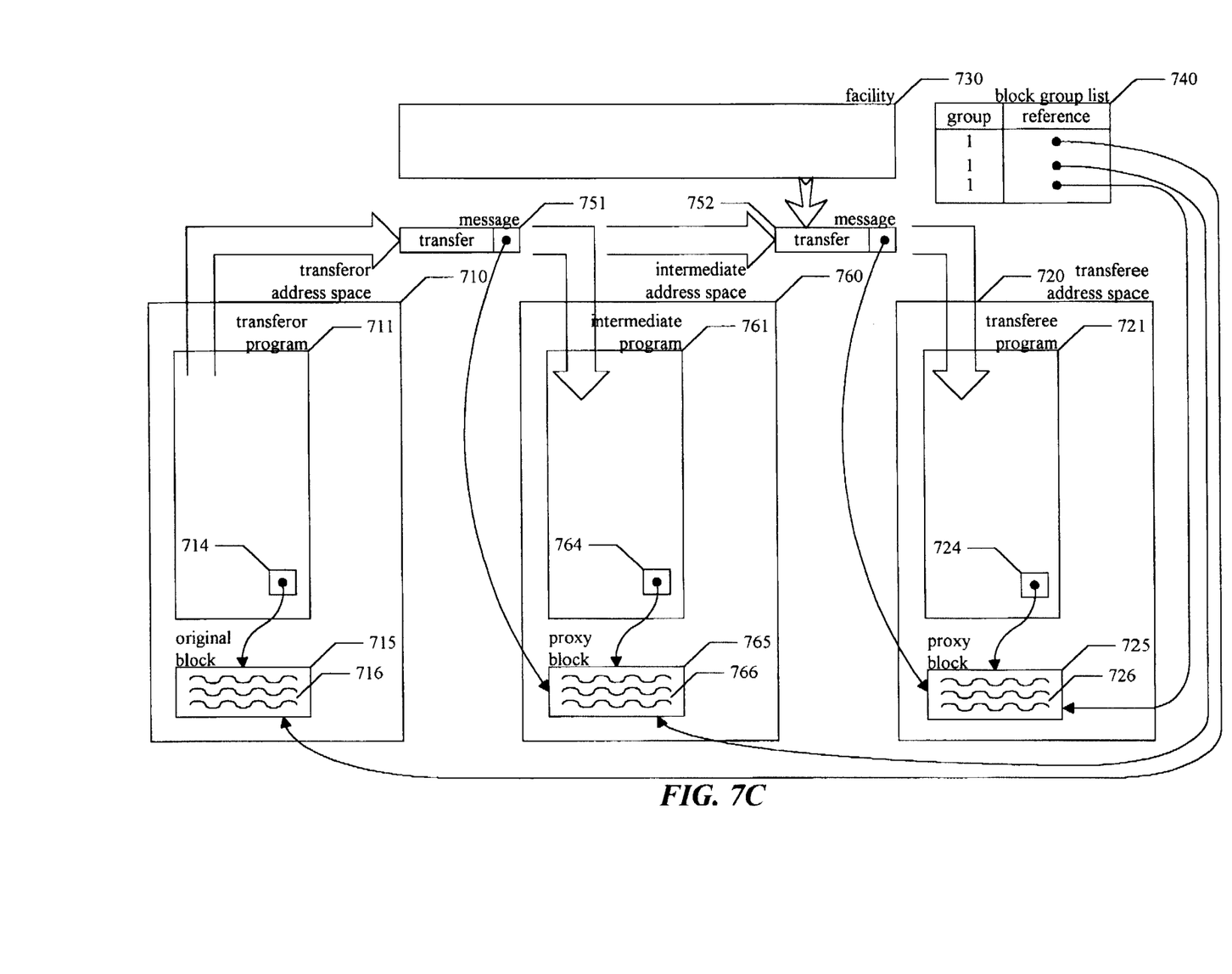

FIGS. 7A–7C are memory diagrams that show the facility enabling a data transfer from a transferor program to a transferee program through an intermediate program. FIG. 7A shows the initiation of the data transfer by the transferor program. The diagram shows a transferor program 711 in a transferor address space 710, a transferee program 721 in a transferee address space 720, and an intermediate program 761 in an intermediate address space 760. The diagram also shows the facility 730, and an empty block group list 740. The transferor program directs a data transfer message ("message") 751 to the intermediate program. The message contains a reference to an original memory block ("original block") 715 in the transferor address space, which contains transferred data 716, copied from the reference 714. As described in greater detail above, the facility intercepts message 751 and executes the InterceptTransfer routine of FIG. 4.

FIG. 7B shows the actions of the facility executing the InterceptTransfer routine in response to intercepting transfer message 751. The facility allocates intermediate proxy block 765 in the intermediate address space, which may be accessed by the intermediate program and any debugging programs that hook the intermediate program. The facility then makes a copy 766 in the proxy block of the data 716 in the original block. The facility substitutes a reference to the intermediate proxy block for the reference to the original block in message 751, and adds references to both the original block and the intermediate proxy block to the block group list, assigning both an unused group number ("1"). When the facility returns, the intermediate program makes a copy 764 of the reference to the intermediate proxy block in the message 751, which may be used by the intermediate program and any programs that hook it to access the intermediate proxy block. The intermediate program then forwards the transfer message 751, which contains a reference to the intermediate proxy block, by directing it, as message 752, to the transferee.

As described in greater detail above, the facility intercepts the message 752 and again executes the InterceptTransfer routine of FIG. 4. FIG. 7C shows the actions of the facility executing the InterceptTransfer routine in response to intercepting the transfer message 752. The facility allocates transferee proxy block 725 in the transferee address space, which may be accessed by the transferee program. The facility then makes a copy 726 in the allocated transferee proxy block of the data 766 in the intermediate proxy block. The facility substitutes a reference to the transferee proxy block for the reference to the intermediate proxy block in message 752, and adds a reference to the transferee proxy block to the block group list, assigning it group number "1". When the facility returns, the transferee program makes a copy 724 of the reference to the transferee proxy block in the message 752, which may be used by the transferee program to access the transferee proxy block. As the discussion above makes clear, a copy of the transferred data is thereafter accessible to each interested program.

When all of the programs are finished sharing the transferred data, one of them will attempt to deallocate the original block. When this happens, the facility causes each member of the block group, including the original block, any intermediate proxy blocks, and the transferee proxy block, to be deallocated. While this is discussed below with respect to an attempt by the transferee to deallocate the proxy block, the facility preferably deallocates all members of a block group when any program attempts to deallocate any of the members.

Figure 8A:
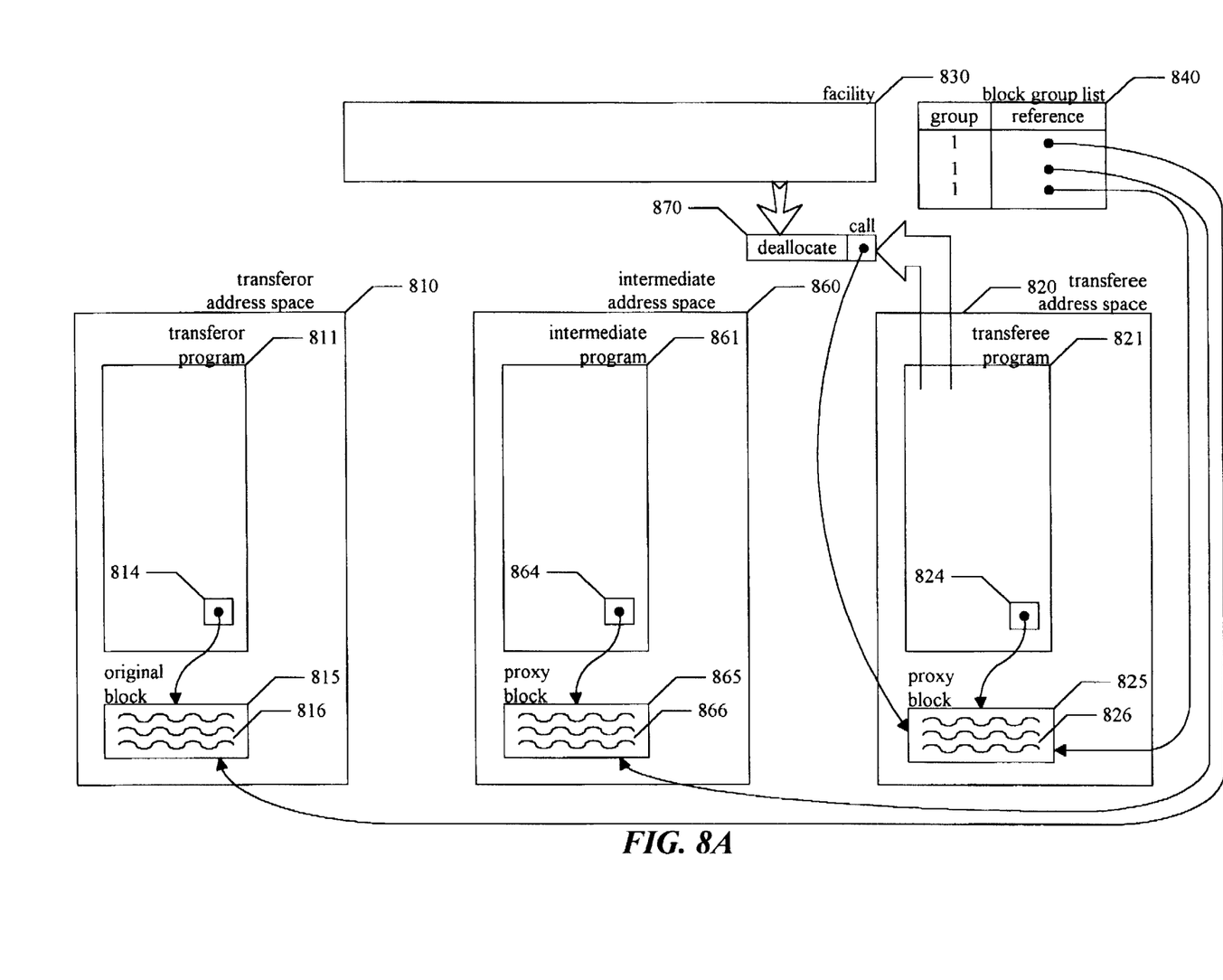
FIGS. 8A–8B are memory diagrams that show the facility reclaiming the resources used for a data transfer through an intermediate program after the data transfer is complete.
Figure 8B:
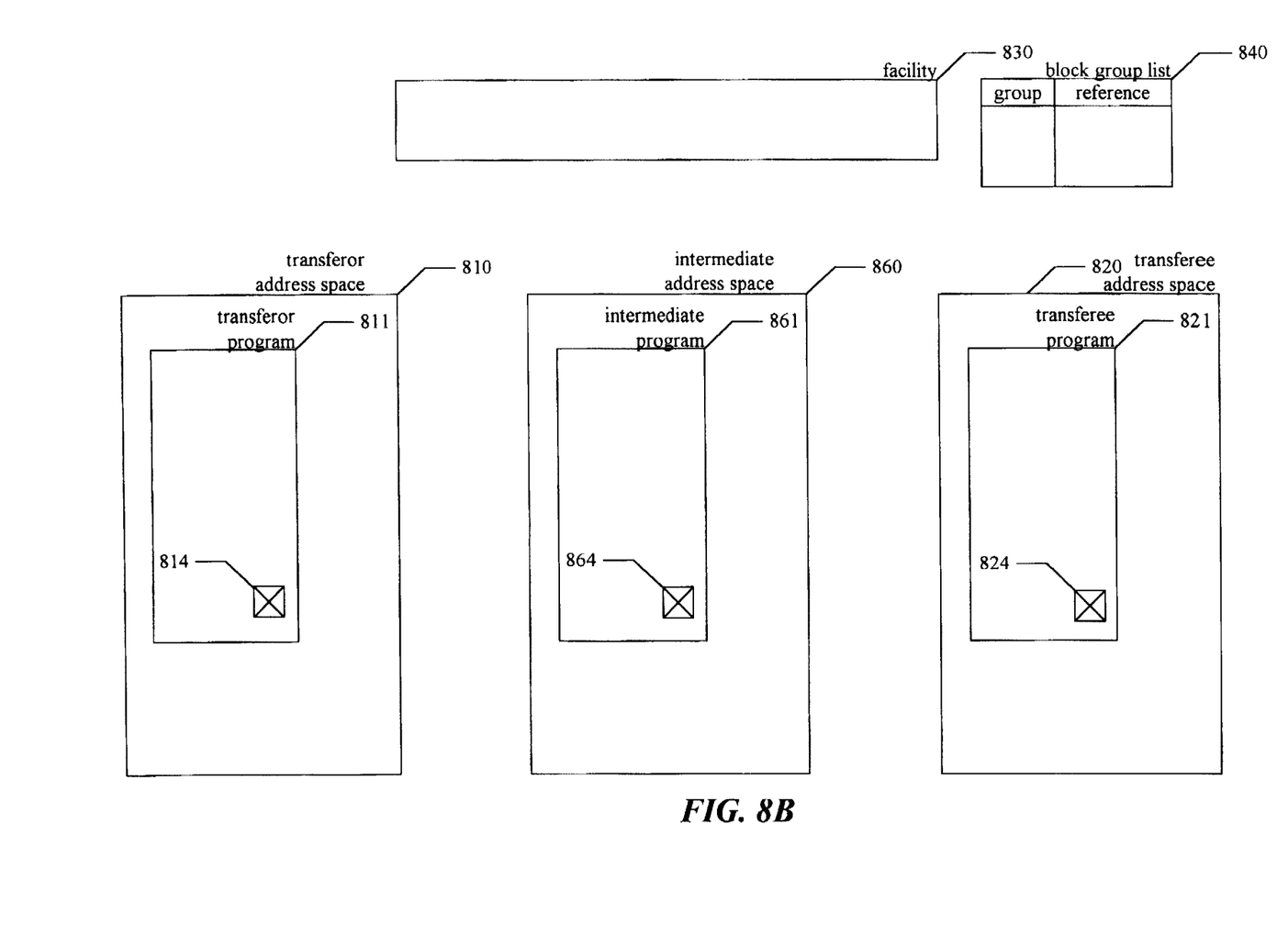

FIGS. 8A–8B are memory diagrams that show the facility reclaiming the resources used for a data transfer through an intermediate program after the data transfer is complete. FIG. 8A shows an attempt by the transferee program to deallocate the proxy block. The transferor program 811 has a reference 814 address space 810 which it uses to access the original block 815. Similarly, the intermediate program 861 has a reference 864 in its address space 860 which it uses to access the intermediate proxy block 865, and the transferee program 821 has a reference 824 in its address space 820 which it uses to access the transferee proxy block 825. The block group list 840 contains references to the original block, the intermediate proxy block, and the transferee proxy block, all having the same group number ("1"), indicating that they are in the same block group. The transferee program makes a deallocation request 870, which contains a reference to the transferee proxy block copied from reference 824. As described in greater detail above, the facility intercepts the deallocation request and executes the InterceptDeallocate routine of FIG. 6.

FIG. 8B shows the actions of the facility executing the InterceptDeallocate routine in response to intercepting the deallocation request. Because the block group list contains a reference matching the reference contained in the intercepted deallocation request, the facility deallocates each block in the same block group as the block referred to by the reference in the deallocation request or schedules it for future deallocation. The facility then removes the references for group "1" from the block group list. As a result, each of the blocks allocated to hold the transferred data are deallocated.

While this invention has been shown and described with reference to preferred embodiments, it will be understood by those skilled in the art that various changes or modifications in form and detail may be made without departing from the scope of the invention.

We claim:

1. A method in a computer system for emulating the provision of a global memory block when a request to allocate a global memory block that is accessible to accessing agents has been received and when a private memory block that is not accessible to the accessing agents is allocated instead of allocating a global memory block that is accessible to the accessing agents as requested, the method comprising the steps of:

detecting that information for accessing the memory block allocated as a additional private memory block that is not accessible to the accessing agents rather than as a global memory block as requested is being provided to one or more of the accessing agents;

allocating one or more private memory blocks, such that at least one of the allocated private memory blocks is accessible to each of the accessing agents to which information for accessing the memory block is being provided; and for each of the accessing agents to which information for accessing said private memory block is being provided, substituting information for accessing one of the allocated private memory blocks that is accessible to the accessing agent for the information for accessing the memory block.

2. The method of claim 1 wherein the detecting step includes the step of receiving an original communication directed to the accessing agents which contains information for accessing the global memory block, and wherein the substituting step includes the steps of:

interrupting the delivery of the original communication; and directing a substitute communication to the accessing agents which contains information for accessing an allocated private memory block.

3. The method of claim 2 wherein the original communication and the substitute communication are messages.

4. The method of claim 1, further including the step of copying the contents of the global memory block to one of the private memory blocks.

5. The method of claim 1, further including the step of copying the contents of the global memory block to each of the private memory blocks.

6. The method of claim 1, further including the steps of:

receiving an instruction to free the private memory blocks; and in response to the receiving step, freeing the global memory block and all of the private memory blocks.

7. The method of claim 1, further including the steps of:

receiving an instruction to free one of the private memory blocks; and in response to the receiving step, freeing the global memory block and all of the private memory blocks.

8. A method in a computer system for facilitating shared memory data transfer from one transferor program to one or more transferee programs without utilizing memory blocks that are accessible to the transferor program and the transferee programs, the method comprising the steps of:

receiving a request from the transferor program to allocate a primary memory block as a shared memory block accessible to both the transferor program and the transferee programs;

in response to the received request, allocating the primary memory block as a private memory block not accessible to all of the transferee programs instead of allocating a shared memory block accessible to both the transferor program and the transferee programs as requested;

intercepting an interprocess communication from the transferor program to the transferee programs containing a reference to the primary memory block containing data to be transferred from the transferor program to the transferee programs;

allocating a secondary memory block accessible to the transferee programs;

duplicating the data contained by the primary memory block in the allocated secondary memory block; and substituting a reference to said allocated secondary memory block for the reference to the primary memory block in the intercepted interprocess communication.

9. The method of claim 8, further including the steps of:

(a) intercepting a request to deallocate the transferor program or one of the transferee programs; and (b) in response to step (a), deallocating the primary memory block and the secondary memory block.

10. The method of claim 9 wherein the computer system contains a block group list, further including the step of storing in the block group list an indication that the primary memory block and the secondary memory block comprise a memory block group, the indication containing a reference to the primary memory block and the secondary memory block, and wherein step (a) includes the step of intercepting a request to deallocate a memory block referred to by a reference that corresponds to one of the references contained in the indication stored in the block group list, and wherein step (b) includes the step of deallocating the memory blocks referred to by each reference contained in the indication stored in the block group list.

11. The method of claim 10, further including the step of, after step (b), removing the stored indication from the block group list.

12. The method of claim 9 wherein the primary and secondary memory blocks may be subject to deallocation only at certain times, and wherein step (b) includes the steps of:

- immediately deallocating the primary memory block if it is immediately subject to deallocation;
- deallocating the primary memory block at a future time at which it is subject to deallocation if it is not immediately subject to deallocation;
- immediately deallocating the secondary memory block if it is immediately subject to deallocation; and
- deallocating the secondary memory block at a future time at which it is subject to deallocation if it is not immediately subject to deallocation.

13. An apparatus for managing a group of memory blocks, comprising:

- a computer memory;
- a first memory block allocator that, in response to a command from a first program to allocate a first block as a shared block accessible to both the first program and a second program, allocates an unsharable block not accessible to the second program;
- a memory block reference provision detector for detecting an attempt by the first program to provide a reference to the first block within the computer memory to the second program which is unable to access the first block;
- an additional memory block allocator for allocating a second block within the computer memory that is accessible to the first program and that corresponds to the first block; and
- a memory block reference provider for providing a reference to the second block in the place of the reference to the first block detected by the memory block reference provision detector.

14. The apparatus of claim 13, further including a memory block contents copier for copying the contents of the first block into the second block after the second block is allocated by the additional memory block allocator.

15. The apparatus of claim 13, further including:

- a deallocation detector for detecting when the first program or the second program is attempting to deallocate the first block or the second block; and
- a group deallocation subsystem for deallocating both the first block and the second block when the deallocation detector detects that the first program or the second program is attempting to deallocate the first block or the second block.

16. A computer-readable medium whose contents cause a computer system to emulate the provision of a global memory block when a request to allocate a global memory block that is accessible to accessing agents has been received and when a private memory block that is not accessible to the accessing agents is allocated instead of allocating a global memory block that is accessible to the accessing agents as requested by performing the steps of:

- detecting that information for accessing the memory block allocated as a private memory block that is not accessible to the accessing agents rather than as a global memory block as requested is being provided to one or more of the accessing agents;
- allocating one or more private memory blocks, such that at least one of the allocated private memory blocks is accessible to each of the accessing agents to which information for accessing the memory block is being provided; and
- for each of the accessing agents to which information for accessing the memory block is being provided, substituting information for accessing one of the allocated private memory blocks that is accessible to the accessing agent for the information for accessing the memory block.

17. The computer-readable medium of claim 16 wherein the detecting step includes the step of receiving an original communication directed to the accessing agents which contains information for accessing the global memory block, and wherein the substituting step includes the steps of:

- interrupting the delivery of the original communication; and
- directing a substitute communication to the accessing agents which contains information for accessing an allocated private memory block.

18. The computer-readable medium of claim 16 wherein the contents of the computer-readable medium further cause the computer system to perform the steps of:

- receiving an instruction to free the private memory blocks; and
- in response to the receiving step, freeing the global memory block and all of the private memory blocks.

19. The computer-readable medium of claim 16 wherein the contents of the computer-readable medium further cause the computer system to perform the steps of:

- receiving an instruction to free one of the private memory blocks; and
- in response to the receiving step, freeing the global memory block and all of the private memory blocks.

* * * * *